United States Patent Office 3,577,501
Patented May 4, 1971

3,577,501
MOLD DOPE AND PROCESS OF USING
Monte H. York, Akron, Ohio, assignor to The Goodyear Tire & Rubber Company, Akron, Ohio
No Drawing. Continuation of application Ser. No. 752,428, July 2, 1968, which is a continuation of application Ser. No. 395,915, Sept. 11, 1964. This application Dec. 4, 1969, Ser. No. 878,965
Int. Cl. B29c 1/04; B29d 27/04
U.S. Cl. 264—213                    10 Claims

ABSTRACT OF THE DISCLOSURE

This invention relates to a method of molding polyurethane foam materials utilizing an improved mold release agent comprising an alpha olefin having from 2 to about 4 carbon atoms and a melting point of about 100 to 250° F. in a carrier and containing .3 to about 5 parts per 100 of a substituted phenylene diamine as an antioxidant.

---

This application is a continuation of application Ser. No. 752,428, filed July 2, 1968, which is in turn a continuation of application Ser. No. 395,915, filed Sept. 11, 1964, both now abandoned.

This invention relates to a method of preparing an improved mold releasing agent, to said agent and a method of using said agent.

In making polyurethane foam products and other castable goods it is essential that the mold for shaping the foam product or cast article does not adhere to the cured polyurethane article. This result is normally achieved by treating the mold with a mold releasing agent. Where the mold is subjected to heat treatment during the curing of the polyurethane article, there is a tendency for the mold release agent to build up within the mold and to produce a cake of material which leads to discoloration and mold releasing difficulties. Particularly is this true in a continuous production line where trouble results in the line being shut down, thereby subjecting the mold to high temperature without being cooled for prolonged periods.

It is an object of this invention to provide a mold releasing agent which is free of the tendencies to produce the aforesaid difficulties during ordinary periods of heat treatment.

This object may be accomplished by adding about 0.3 to about 5 parts and preferably about 1.5 to 3 parts of an antioxidant of the type hereinafter described for each hundred parts of a polyolefin mold releasing agent.

The polyolefin useful for the mold releasing agent of this invention is a polymer of an alpha olefin having from 2 to about 4 carbon atoms and a melting point of about 100 to about 250° F. Representative examples of these polymers are the polyethylenes, polypropylenes and mixtures of these, or copolymers of ethylene and propylene.

Normally the polyolefin is suspended or dissolved in an inert carrier to facilitate its application to the mold by such well known methods as brush or spray applications. The amount of carrier used with the polyolefin will vary widely depending on the molecular weight and melting point of the polyolefin and solvent power of the carrier. Thus, in some cases only 5 to 10% by weight of carrier may be needed while in others the amount may be 50% or even as high as 80 to 90%. The amount used usually will be sufficient to permit the mold release composition to be applied as by brushing or spraying.

The carrier should not have a deleterious effect on the molded product and should be volatile at the higher temperature of the mold, usually about 250° F. or lower. Representative carriers are water and the low boiling hydrocarbons having an end point on ASTM distillation of less than about 520° F.

To be more specific, a laboratory mold of 12" x 12" x 2" having a floating top plate was cleaned by blasting with walnut shell flour to remove any of the debris from the previous molding operation. The freshly cleaned mold was coated with a polyethylene mold release agent to insure a good release of the molded object. A polyurethane foamable mixture then was poured into the coated mold and allowed to react and cure before being stripped. This mold was coated and the lid clamped shut and the empty mold was placed in a 525° F. oven for 5 minutes. The mold was removed from the oven, cooled and another polyurethane foamable mixture poured and allowed to react and cure before being stripped. If the release of the polyurethane foam from the mold was satisfactory, again it was coated with a release agent and another molded object was poured and subjected to a heat treatment for 8 minutes at 525° F. If release was satisfactory after this 8 minutes in the oven, the mold release agent was judged to be satisfactory for the conditions experienced in normal continuous foam operation. It should be noted that the release agents of the polyolefin type normally fail to release after 5 minutes in a 525° F. oven where the antioxidant is not present in the releasing agent.

The following examples are illustrative of the preparation of the antioxidants useful in this invention:

EXAMPLE I

Hydroquinone was reacted in an autoclave, equipped to remove water with about 10% excess of an equal mixture of aniline and ortho toluidine at about 250–300° C. in the presence of ferric chloride as a catalyst. The water formed by the reaction was removed from the autoclave. When no more water was obtained from the autoclave, the reaction mixture was cooled to about 150° C. and sufficient 25% by weight aqueous sodium carbonate was added to neutralize the catalyst. The free water was flashed and then the liquid residue in the autoclave was filtered to obtain the substituted phenylene diamine as a filtrate which solidified on cooling. The solid product was passed through a flaker to yield a comminuted product.

EXAMPLE II

The procedure of Example I was repeated except a mixture of toluidines and mixed xylidines were used instead of aniline and ortho-toluidine to produce a flaked substituted phenylene diamine.

Other satisfactory antioxidants useful in this invention may be produced by the procedure of Example I using the materials from Tables 2 and 3.

EXAMPLE III

One pound of polyethylene having a density of .91, a molecular weight of 1500 and a melting point (ASTM E–2851T) of about 210–230° F. was dissolved in sufficient low flash naptha to give a 16% dispersion, then sufficient amounts of the antioxidants listed in Table 1 were blended into the low flash naphtha dispersion of the polyethylene to give an antioxidant concentration of 2.5 parts per hundred parts of a polyethylene. This mold release agent containing the antioxidant was sprayed upon a freshly shell blasted mold and its ability to release a polyurethane composition was determined after being exposed for 8 minutes in an oven at 525° F. If the antioxidants gave satisfactory releasing activity after being exposed for 8 minutes at a temperature of 525° F., it was rated pass, or satisfactory, in Table 1.

TABLE 1

| Antioxidant: | Rating |
|---|---|
| The comminuted product of Example I | Pass. |
| The comminuted product of Example II | do. |

The polyurethane foamable composition utilized in the above test included the following ingredients and was mixed in a one-step mixing machine.

(1) 100 parts of a polypropylene ether glycol of about 1500 to 3000 molecular weight;
(2) 100 parts of a polypropylene ether triol of about 1500 to 3000 molecular weight;
(3) approximately 10 parts of trichlorofluoro methane;
(4) 84 to 88 parts of toluene diisocyanate (80/20 isomer);
(5) 5.6 parts water;
(6) 0.4 part stannous octate;
(7) 0.4 part of triethylene diamine;
(8) 0.4–.8 part of an N-ethyl morpholine;
(9) 4–6 parts of a silicone which contains blocked polymeric groups of the polyoxy ethylene and the polyoxy propylene types.

The antioxidants useful in this invention are substituted phenylene diamines having the following structure:

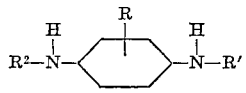

wherein R is selected from the group consisting of hydrogen, alkyl radicals having from 1 to 12 carbon atoms, cycloalkyl radicals having from 5 to 24 carbon atoms, and aryl radicals having from 6 to 24 carbon atoms, wherein R' is selected from the group consisting of alkyl radicals having from 1 to 12 carbon atoms, cycloalkyl radicals having from 5 to 24 carbon atoms, and aryl radicals having from 6 to 24 carbon atoms and wherein $R^2$ is an aryl radical having from 6 to 24 carbon atoms.

Preferred compositions are those N,N'-disubstituted para-phenylene diamines (a) wherein the substituents attached to the nitrogens are both lower alkyl substituted phenyl radicals, (b) wherein one substituent is a phenyl radical and the other a lower alkyl substituted phenyl radical, or (c) wherein one substituent is a lower alkyl substituted phenyl radical and the other is a secondary or tertiary alkyl radical.

The useful substituted phenylene diamines which have proved to be unusually effective in this invention include N,N' substituted diaryl para phenylene idamines and N-aryl, N'-dialkyl phenylene diamines wherein the alkyl radicals may be primary, secondary, or tertiary and are preferably secondary.

The phenylene diamines of this invention are illustrated by the compounds listed in Table 2:

TABLE 2

N-ortho-tolyl-N'(2,4 dimethyl phenyl)-para-phenylene-diamine
N-meta-tolyl-N'(2,4 dimethyl phenyl)-para-phenylene-diamine
N-para-tolyl-N'(2,4 dimethyl phenyl)-para-phenylene-diamine
N,N'-di-ortho-ethyl-phenyl-para-phenylene diamine
N,N'-di(di-ortho-ethyl phenyl)-para-phenylene diamine
N-para-tertiary butyl phenyl-N'-phenyl-para-phenylene-diamine
N,N'-di(para-tertiary butyl phenyl)-para-phenylene-diamine
N,N'-di(2,4 dimethyl phenyl)-para-phenylene diamine
N,N'-di-para-ethyl phenyl-para-phenylene diamine
N-para-ethyl phenyl-N'(2,4 dimethyl phenyl)-para-phenylene diamine
N-ortho-ethyl phenyl-N'(2,4 dimethyl phenyl)-para-phenylene diamine
N-(di-ortho ethyl phenyl)-N'-(2,4 dimethyl phenyl)-para-phenylene diamine
N-ortho-tolyl-N'-ortho-ethyl phenyl-para-phenylene-diamine
N-ortho tolyl-N'-para-ethyl phenyl-para-phenylene-diamine
N-para-tolyl-N'-ortho-ethyl phenyl-para-phenylene-diamine
N-meta-tolyl-N'-para-ethyl phenyl-para-phenylene diamine
N-ortho-tolyl-N'-para-tertiary butyl phenyl-para-phenylene diamine
N-para-tolyl-N'-para-tertiary butyl phenyl-para-phenylene diamine
N-meta-tolyl-N'-para-tertiary butyl phenyl-para-phenylene diamine
N-ortho-tolyl-N'-phenyl-para-phenylene diamine
Di-ortho-tolyl-para-phenylene diamine
Di-meta-tolyl-para-phenylene diamine
Di-para-tolyl-para-phenylene diamine
N-para-tolyl-N'-phenyl-phenylene diamine
N-meta-tolyl-N'-phenyl-para-phenylene diamine
N-2,4-dimethyl phenyl-N'-phenyl-para-phenylene diamine
Di(ortho-methoxy phenyl)para-phenylene diamine
Di(para-methoxy phenyl)para-phenylene diamine
Di(para-ethoxy phenyl)-para-phenylene diamine The ring alkylated diphenyl phenylene diamines of this invention may be further illustrated by the following products obtained by reacting various aromatic amines or mixtures of aromatic amines with either hydroquinone, toluhydroquinone, methoxy hydroquinone, or para-aminophenol. Table 3 contains a list of these representative aromatic diamines:

TABLE 3

2,4 dimethyl aniline
Mixed xylidines
Mixed toluidines and mixed xylidines
A mixture of $C_5$ anilines
A mixture of $C_{12}$ anilines
A mixture of $C_5$ anilines and mixed toluidines
A mixture of $C_5$ anilines and o-toluidine
A mixture of $C_5$ anilines and mixed xylidines
A mixture of $C_5$ anilines and aniline
Ortho-ethyl aniline
D-ortho-ethyl aniline
Mixed toluidines and ortho-ethyl aniline
Mixed xylidines and ortho-ethyl aniline
Di-ortho-ethyl aniline and aniline
Para-tertiary butyl aniline
Para-tertiary butyl aniline and aniline
Meta-toluidine and 2,4-dimethyl aniline
Para-toluidine and 2,4-dimethyl aniline
Ortho-toluidine and mixed xylidines
Aniline and ortho-toluidine
Aniline and meta-toluidine
Aniline and para-toluidine
Mixed toluidines
Mixed toluidine and aniline
Mixed xylidines and aniline
2,4 dimethyl aniline and aniline
Mixed anisidines
Mixed phenetidines
o-Anisidine and aniline
p-Anisidine and aniline
o-Anisidine and mixed toluidines
p-anisidine and o-toluidine
p-phenetidine and aniline
p-phenetidine and p-toluidine Illustrative of the N-aryl N' alkyl compounds are the following:

N-phenyl-N'-methyl-para-phenylene diamine
N-phenyl-N'-ethyl-para-phenylene diamine
N-phenyl-N'-isopropyl-para-phenylene diamine N-phenyl-N'-propyl-para-phenylene diamine
N-phenyl-N'-normal-butyl-para-phenylene diamine
N-phenyl-N'-isobutyl-para-phenylene diamine
N-phenyl-N'-sec. butyl-para-phenylene diamine
N-phenyl-N'-tertiary butyl-para-phenylene diamine
N-phenyl-N'-hexyl-para-phenylene diamine
N-phenyl-N'-octyl-para-phenylene diamine
N-phenyl-N'-sec.-undecyl-para-phenylene diamine
N-phenyl-N'-sec.-tridecyl-para-phenylene diamine
N-phenyl-N'-tertiary-octadecyl-para-phenylene diamine
N-phenyl-N'-cyclohexyl-para-phenylene diamine
N-phenyl-N'-alphaphenyl ethyl para-phenylene diamine
N-phenyl-N'-benzyl-para-phenylene diamine In place of the phenyl radical in the above listed N-aryl, N'alkyl compounds the following may be substituted: orthotolyl, meta-tolyl, para-tolyl, ortho-ethyl phenyl, para-tertiarybutyl phenyl, octyl phenyl, dodecyl phenyl, octa decyl phenyl, ortho-methoxy phenyl, para-methoxy phenyl, ortho-ethoxy phenyl, para-ethoxy phenyl, 2,4-dimethyl phenyl, 3,5-dimethyl phenyl, para-propoxy phenyl, ortho-butoxy phenyl, tri methyl phenyl, etc.

The substituted diamines of this invention may be made by any well known process. The following represent known processes for preparing substituted phenylene diamines.

Hydroquinone, para-aminophenol, toluhydroquinone, methoxyhydroquinone, etc., may be reacted with various amines or mixtures of amines at elevated temperatures in the presence of condensation catalysts. This method is described in U.S. Pat. No. 2,087,199 and is useful for preparing the diaryl-para-phenylene diamines. The direct alkylation of the benzene nucleus with olefines in the presence of alkylation catalysts is described in U.S. Pat. No. 2,530,769. This applies to the preparation of certain alkylated diphenyl-para-phenylene diamines. Another method is direct alkylation of the amino group in such compounds as para-aminodiphenylamine by treatment with an arylalkenyl composition, e.g. styrene, in the presence of a known catalyst. This applies to the preparation of certain N-aralkyl-N'-phenyl-para-phenylene diamines. For reference see 44 Chemical Abstracts 5321. The N-aryl N' alkyl para phenylene diamines may be made by alkylation of the amino group in compounds such as para-amino-diphenylamine by use of alkylating agents such as alkyl halides, aralkyl halides, alkyl sulfates, alkyl phosphates and alkyl phosphites. Another method for preparing the compounds is reductive alkylation of nitro-, nitroso- or amino derivatives of diphenylamine with aldehydes or ketones in the presence of hydrogen or certain reducing agents. This process is further defined in U.S. 2,381,015; U.S. 2,323,948; Organic Reactions, vol. IV, pages 174–256; and Organic Reactions, vol. V, pages 301–331.

While certain representative emobdiments and details have been shown for the purpose of illustrating the invention, it will be apparent to those skilled in this art that various changes and modifications may be made therein without departing from the spirit or scope of the invention.

What is claimed is:
1. In a method of continuously molding polyurethane foam wherein the mold is subjected to temperatures to about 250° F., the improvement comprising coating the mold with a mold release agent and then pouring a liquid polyurethane foamable reaction mixture into the mold and curing the foamable reaction mixture at a temperature to about 250° F. while still in the mold and stripping the cured foam from the mold, said mold release agent comprising a polymer of an alpha olefin having 2 to 4 carbon atoms and a melting point of about 100 to about 250° F. in sufficient carrier to permit the mold release agent to be brush applied, said polymer containing from about 0.3 to 5 parts per hundred of an antioxidant consisting essentially of a substituted phenylene diamine having the structure

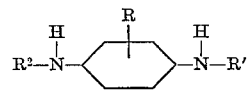

wherein R is selected from the radicals consisting of H and an alkyl radical having from 1 to about 12 carbon atoms, cycloalkyl having from 5 to about 24 carbon atoms and aryl radicals having from 6 to about 24 carbon atoms, and R' and R² are aryl radicals having from 6 to about 24 carbon atoms.

2. The mold release agent of claim 1 wherein the carrier is water.

3. The mold release agent of claim 1 wherein R is hydrogen, R' is aryl and R² is aryl.

4. The mold release agent of claim 1 wherein at least one of the substituents on the phenylene diamine is phenyl.

5. The mold release agent of claim 1 wherein at least one of the substituents on the phenylene diamine is tolyl.

6. The mold release agent of claim 1 wherein at least one of the substituents on the phenylene diamine is xylyl.

7. The mold release agent of claim 2 wherein R is hydrogen, R' is aryl and R² is aryl.

8. The mold release agent of claim 1 wherein the carrier is a hydrocarbon having on an end point an ASTM distillation of less than 520° F.

9. The mold release agent of claim 1 wherein the carrier comprises about 10 to 90 percent by weight thereof.

10. The mold release agent of claim 1 wherein the polyolefin is a polyethylene.

References Cited
UNITED STATES PATENTS
2,985,617   5/1961   Salyer et al. _____ 260—45.7
3,101,244   8/1963   Hood et al. _____ 264—54

MURRAY TILLMAN, Primary Examiner
W. J. BRIGGS, SR., Assistant Examiner

U.S. Cl. X.R.
260—2.5, 29.6, 45.9; 264—54, 338